United States Patent
Ho et al.

(10) Patent No.: US 7,764,469 B2
(45) Date of Patent: Jul. 27, 2010

(54) NOTCHED SHIELD AND POLE STRUCTURE WITH SLANTED WING FOR PERPENDICULAR RECORDING

(75) Inventors: Kuok San Ho, Santa Clara, CA (US); Yimin Hsu, Sunnyvale, CA (US); Ching Hwa Tsang, Santa Clara, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1067 days.

(21) Appl. No.: 10/976,479

(22) Filed: Oct. 29, 2004

(65) Prior Publication Data

US 2006/0092565 A1    May 4, 2006

(51) Int. Cl.
G11B 5/33    (2006.01)
(52) U.S. Cl. ................................... 360/319
(58) Field of Classification Search .............. None
See application file for complete search history.

(56) References Cited

U.S. PATENT DOCUMENTS

| | | | | |
|---|---|---|---|---|
| 4,939,609 | A | | 7/1990 | Zieren et al. ........... 360/125 |
| 5,073,836 | A | * | 12/1991 | Gill et al. ............. 360/317 |
| 5,754,376 | A | | 5/1998 | Kobayashi et al. ..... 360/113 |
| 5,910,868 | A | | 6/1999 | Kurosawa et al. ...... 360/113 |
| 5,923,502 | A | * | 7/1999 | Christensen et al. ... 360/319 |
| 5,986,856 | A | | 11/1999 | Macken et al. ........ 360/113 |
| 6,097,578 | A | | 8/2000 | Pokhil ................. 360/319 |
| 2003/0021064 | A1 | * | 1/2003 | Ohtomo et al. ........ 360/126 |
| 2003/0193742 | A1 | | 10/2003 | Matono et al. ......... 360/126 |
| 2004/0071017 | A1 | | 4/2004 | Seigler et al. ......... 365/200 |
| 2004/0075927 | A1 | | 4/2004 | Gill .................... 360/55 |
| 2004/0190205 | A1 | | 9/2004 | Miyauchi .............. 360/324.1 |
| 2005/0018348 | A1 | * | 1/2005 | Lille et al. ............ 360/128 |
| 2005/0280935 | A1 | * | 12/2005 | Clinton et al. ......... 360/125 |
| 2006/0250712 | A1 | * | 11/2006 | Matono et al. ......... 360/1 |

FOREIGN PATENT DOCUMENTS

JP      03280208 A  *  12/1991

OTHER PUBLICATIONS

Search Report from European Patent No. EP 05 25 4239 which was mailed on Jun. 30, 2006.
Search Report from European Patent No. EP 05 25 4239 which was mailed on Sep. 12, 2005.

* cited by examiner

Primary Examiner—David D Davis
(74) Attorney, Agent, or Firm—Zilka-Kotab, PC

(57) ABSTRACT

A magnetic structure for use in a magnetic head for avoiding stray field writing. The magnetic structure can be for example a magnetic shield or could be a magnetic pole of a write head and is particularly advantageous for use in a perpendicular recording system, because such perpendicular recording systems are especially susceptible to stray field writing. The magnetic structure includes a forward protruding portion that extends toward the air bearing surface (ABS) of the head also includes first and second wing portions that extend laterally from the forward protruding portion. The wing portions each have a front edge that is recessed from the ABS. The wings are tapered so that the amount of recess of the front edge of the wings increases with lateral distance from the center of the magnetic structure.

29 Claims, 9 Drawing Sheets

NOTCHED SHIELD AND POLE STRUCTURE WITH SLANTED WING FOR PERPENDICULAR RECORDING

FIELD OF THE INVENTION

The present invention relates to current perpendicular magnetic recording and more particularly to novel magnetic shield and pole designs having reduced stray field sensitivity.

BACKGROUND OF THE INVENTION

The present invention is related to the following commonly assigned patent applications: Winged Design For Reducing Corner Stray Magnetic Fields, application Ser. No. 10/977,315 Filed Oct. 29, 2004; Winged Pole and Shield Structure for Reduced Stray Field in a Perpendicular Write Head, application Ser. No. 10/971,478, filed on Oct. 29, 2004; and Double Notched Shield and Pole Structure For Stray Field Reduction in a Magnetic Head, application Ser. No. 10/977,446, filed Oct. 29, 2005.

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetization oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

Perpendicular storage systems facilitate greater storage density over longitudinal systems. Although a more detailed discussion of a perpendicular recording system in which the present invention may be embodied is present in the following Detailed Description of the Invention, a more focused discussion of a challenge presented by such perpendicular recording systems is presented here with reference to FIG. 1, in which a magnetic structure 102, which could be for example a magnetic shield, magnetic pole or some other magnetic structure is shown along with its relationship to a magnetic medium 112.

The magnetic medium 112 of a perpendicular recording system creates problems with regard to data erasure that are not generally encountered with longitudinal recording systems. The magnetic medium 112 includes a thin magnetically hard top layer 114 and a low coercivity underlayer 110. Because of its low coercivity and relatively large size, the soft underlayer is extremely susceptible to being affected by magnetic fields.

With reference still to FIG. 1, when a longitudinal external field 104 is applied, the soft underlayer 110 accentuates the collection of magnetic charges in the corners of magnetic structures 102 of the recording head which are exposed at the air bearing surface (ABS) of the head, as indicated by lines 106. This can result in unwanted stray magnetic fields 108 collecting in the corners of the magnetic structure, which can potentially erase stored data from recording medium 158. It should be pointed out that, while the flux 106 is being described as resulting from a longitudinal field, a similar result would occur as from the presence of a vertical field, or a field canted at some other angle therebetween.

Although magnetic structures such as magnetic shields and magnetic poles exhibit the problem described above, such magnetic structures are a necessary part of magnetic recording head and cannot simply be eliminated. Therefore, there is a strong felt need for a design for magnetic structures that can allow efficient performance of the magnetic structure for its intended purpose (such as a magnetic shield) while avoiding such unwanted stray field writing. Such a solution to the above problem would preferably not involve the addition of significant processes complexity and would allow the use of currently available desired magnetic materials.

SUMMARY OF THE INVENTION

The present invention provides a magnetic structure for use in a magnetic head configured to prevent stray field writing in an adjacent magnetic medium. The magnetic structure has a forward protruding portion that extends toward the air bearing surface (ABS) of the head. First and second wing shaped portions extend to the left and right of the forward protruding portion. Each of the wing portions has a recessed front edge adjacent to the air bearing surface (ABS) that is configured such that the amount of recess of the front edge of the wing portion increases with increasing distance from the forward protruding portion.

The taper of the wing portions advantageously displaces the focal point of the magnetic flux concentration (ie. the outer forward corners of the wings) away from the ABS. This ensures that any magnetic field emitted from the corners of the wings will be sufficiently far from the magnetic medium that inadvertent stray field writing will not occur.

The taper of the wing portions also advantageously causes the outer front corners of the wing portions to form an obtuse angle, which reduces flux concentration at these corners and further prevents stray field writing.

The taper of the front edge of the magnetic shield has a slope that is defined as the change in distance from the air bearing surface divided by a corresponding change in lateral distance from the forward protruding portion of from the center of the structure.

This slope is preferably about 1 to 15 degrees The forward extending portion is preferably located at the center of the magnetic structure as measured along the lateral axis, but need not be located right at the center of the structure.

The front edge of the laterally extending wing portion (the edge closest to the ABS) is preferably recessed at least 0.2 um to 3.0 um from the ABS at its inner most end. The outer most end of the wing portion is preferably recessed 0.5 um to 8 um from the ABS.

The invention is helpful in reducing the concentration of flux (and thus the fields) at the corners that are exposed on the active surface of the head. The overall geometry and magnetic properties of the head structure and soft underlayer are the other factors that determine the absolute fields that appear at these corners and that are induced in response to write-current and/or external field. The relative sensitivities to write current and to external field components along various directions can be adjusted by changing the geometry of the head structure. For example, wider wings tend to decrease (improve) sensitivity to 'cross-track' external fields but increase (aggravate) sensitivity to "perpendicular" external fields. The ability to make such trade-offs by tuning the geometry of the head structure is also very important in maximizing overall robustness of the recording system against external fields.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
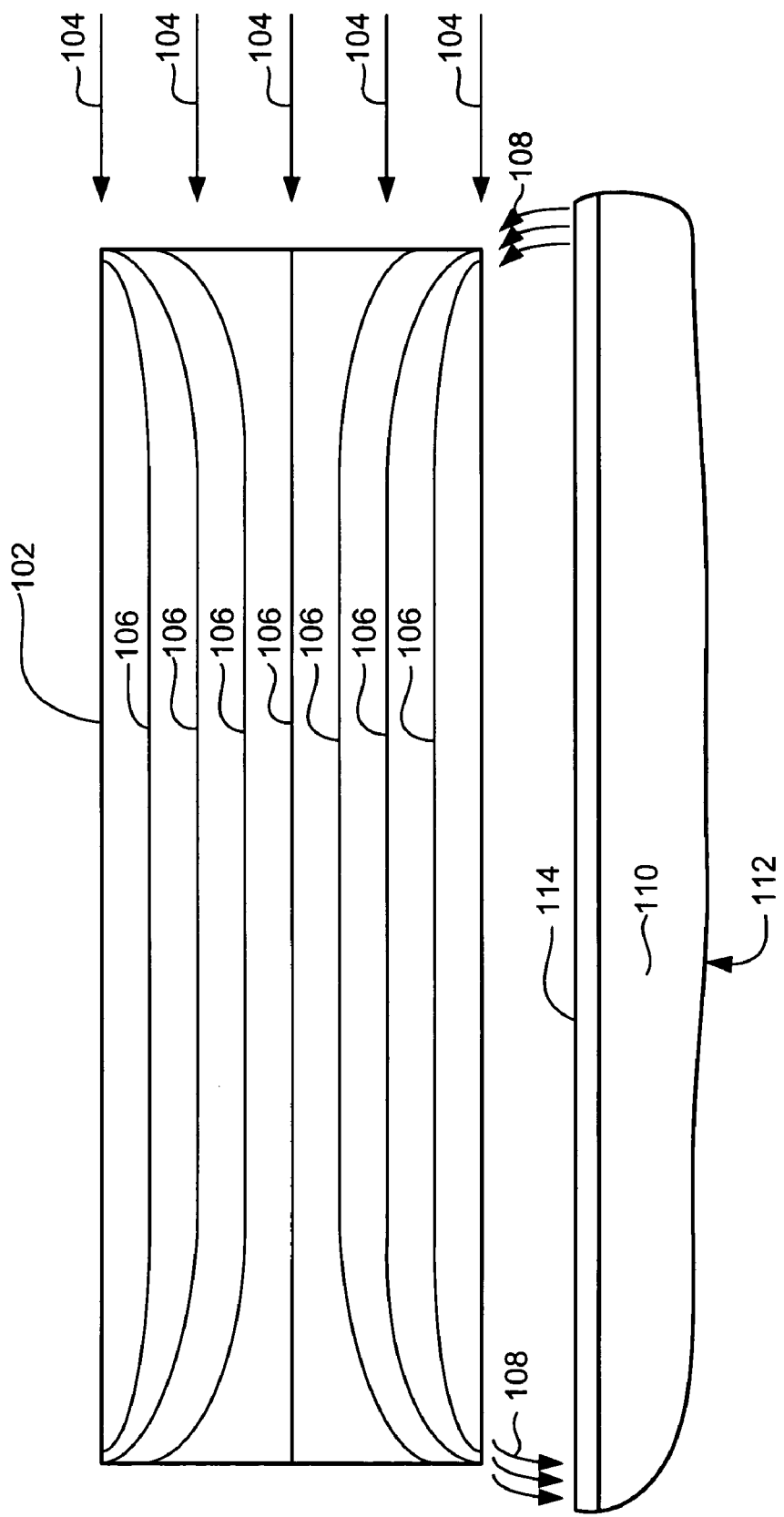
FIG. 1 is a view of a magnetic structure illustrating the effect of an environmental magnetic field on the magnetic structure and adjacent magnetic medium.
Figure 2:
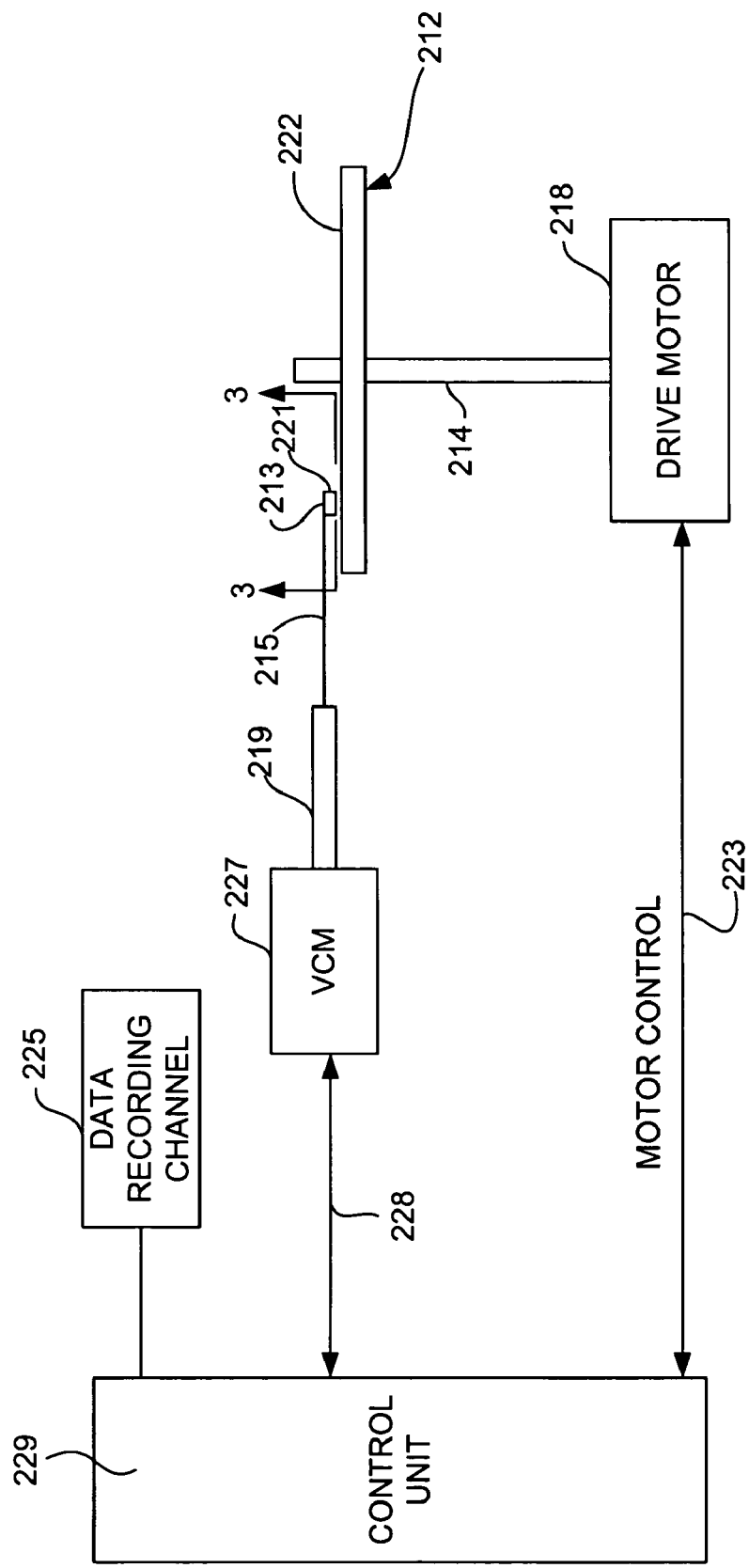
FIG. 2 is a schematic illustration of a disk drive system in which the invention might be embodied.

Referring now to FIG. 2, there is shown a disk drive 200 embodying this invention. As shown in FIG. 2, at least one rotatable magnetic disk 212 is supported on a spindle 214 and rotated by a disk drive motor 218. The magnetic recording on each disk is in the form of annular patterns of concentric data tracks (not shown) on the magnetic disk 212.

At least one slider 213 is positioned near the magnetic disk 212, each slider 213 supporting one or more magnetic head assemblies 221. As the magnetic disk rotates, slider 213 moves radially in and out over the disk surface 222 so that the magnetic head assembly 221 may access different tracks of the magnetic disk where desired data are written. Each slider 213 is attached to an actuator arm 219 by way of a suspension 215. The suspension 215 provides a slight spring force which biases slider 213 against the disk surface 222. Each actuator arm 219 is attached to an actuator means 227. The actuator means 227 as shown in FIG. 2 may be a voice coil motor (VCM). The VCM comprises a coil movable within a fixed magnetic field, the direction and speed of the coil movements being controlled by the motor current signals supplied by controller 229.

During operation of the disk storage system, the rotation of the magnetic disk 212 generates an air bearing between the slider 213 and the disk surface 222 which exerts an upward force or lift on the slider. The air bearing thus counter-balances the slight spring force of suspension 215 and supports slider 213 off and slightly above the disk surface by a small, substantially constant spacing during normal operation.

The various components of the disk storage system are controlled in operation by control signals generated by control unit 229, such as access control signals and internal clock signals. Typically, the control unit 229 comprises logic control circuits, storage means and a microprocessor. The control unit 229 generates control signals to control various system operations such as drive motor control signals on line 223 and head position and seek control signals on line 228. The control signals on line 228 provide the desired current profiles to optimally move and position slider 213 to the desired data track on disk 212. Write and read signals are communicated to and from write and read heads 221 by way of recording channel 225.

Figure 3:
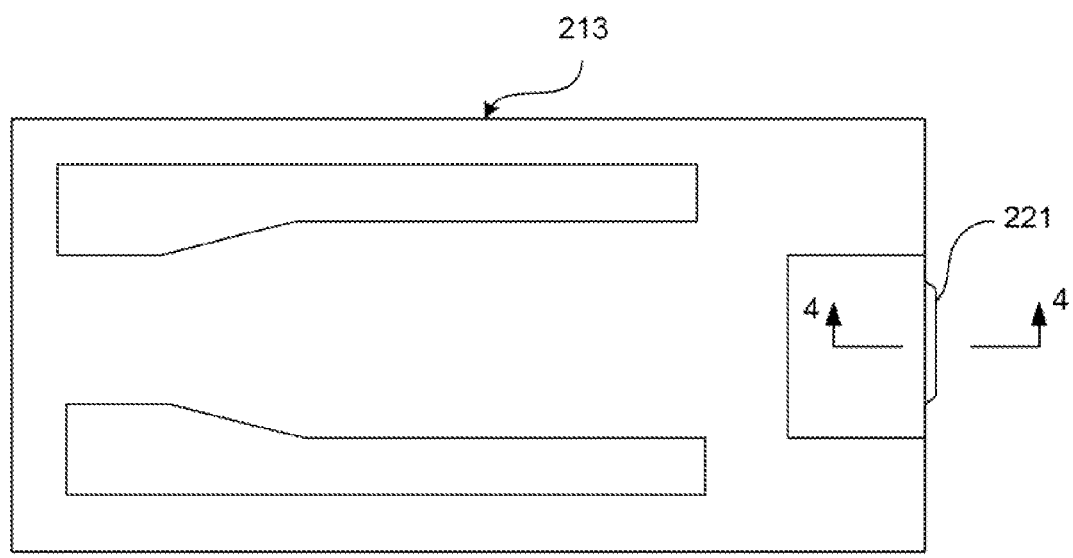
FIG. 3 is an ABS view of a slider, taken from line 3-3 of FIG. 2, illustrating the location of a magnetic head thereon.

With reference to FIG. 3, the orientation of the magnetic head 221 in a slider 213 can be seen in more detail. FIG. 3 is an ABS view of the slider 213, and as can be seen the magnetic head including an inductive write head and a read sensor, is located at a trailing edge of the slider. The above description of a typical magnetic disk storage system, and the accompanying illustration of FIG. 2 are for representation purposes only. It should be apparent that disk storage systems may contain a large number of disks and actuators, and each actuator may support a number of sliders.

Figure 4:
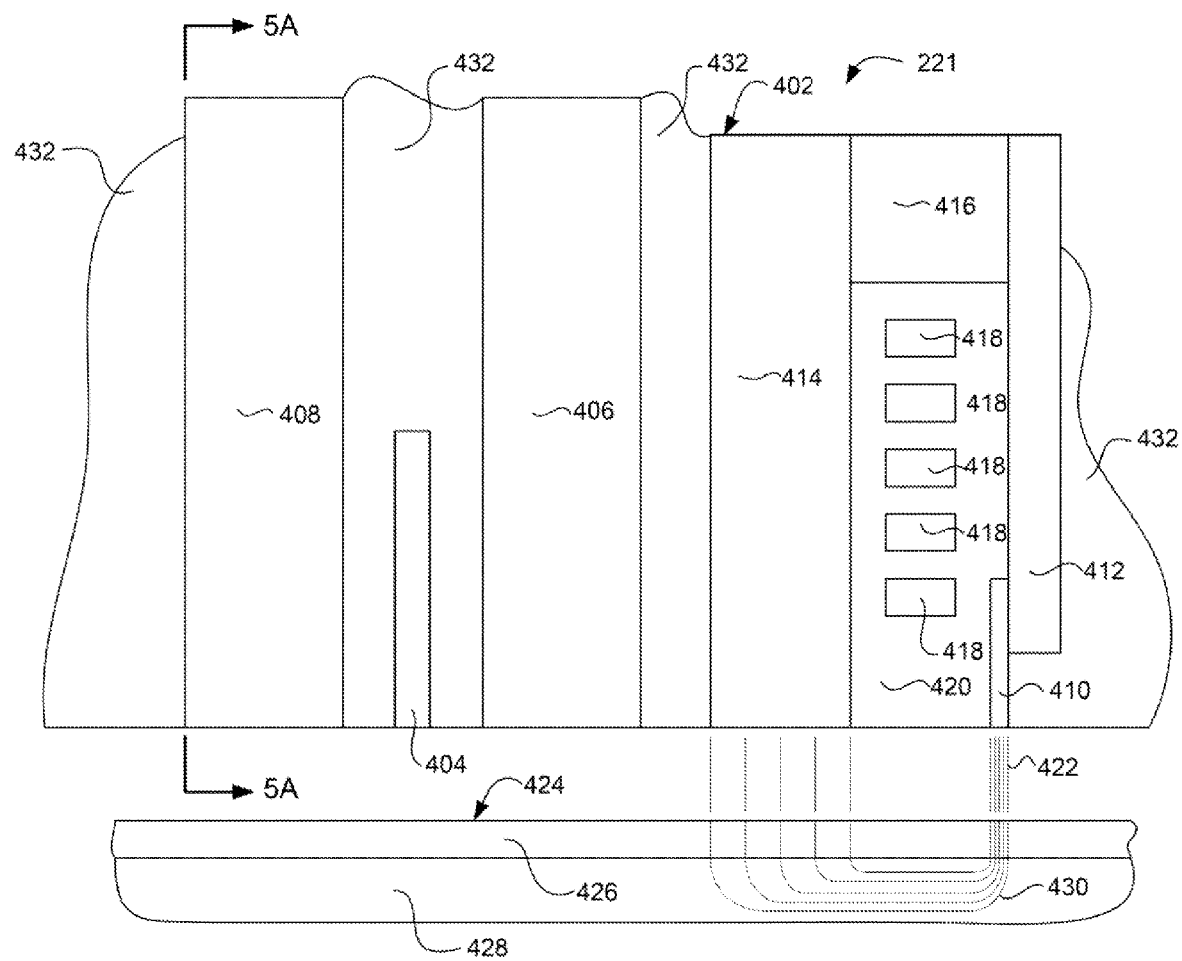
FIG. 4 is an ABS view, taken from line 4-4 of FIG. 3 and rotated 180 degrees, of a magnetic head according to an embodiment of the present.

With reference now to FIG. 4, the magnetic head 221 for use in a perpendicular magnetic recording system is described. The head 221 includes a write element 402 and a read sensor 404. The read sensor is preferably a giant magnetoresistive (GMR) sensor and is preferably a current perpendicular to plane (CPP) GMR sensor. CPP GMR sensors are particularly well suited for use in perpendicular recording systems. However, the sensor 404 could be another type of sensor such as a current in plane (CIP) GMR sensor or, a tunnel junction sensor (TMR) or some other type of sensor. The sensor 404 is located between and insulated from first and second magnetic shields 406, 408. The magnetic shields, which can be constructed of for example CoFe or NiFe, absorb magnetic fields, such as those from uptrack or down track data signals, ensuring that the read sensor 404 only detects the desired data track located between the shields 406, 408.

With continued reference to FIG. 4, the write element 402 includes a write pole 410, that is magnetically connected with a magnetic shaping layer 412. The write pole has a small cross section at the air bearing surface (ABS) and is constructed of a magnetic material having a high saturation moment density such as FeNi or CoFe. The shaping layer 412 is constructed of a magnetic material such as CoFe or NiFe and has a cross section parallel to the ABS surface that is significantly larger than that of the write pole 410.

The write element 402 also has a return pole 414 that preferably has a surface exposed at the ABS surface and has a cross section parallel with the ABS surface that is much larger than that of the write pole 410. The write pole 414 is magnetically connected with the shaping layer 412 by a back gap portion 416. The return pole 414 and back gap 416 can be constructed of, for example, NiFe, CoFe or some other magnetic material.

An electrically conductive write coil 418, shown in cross section in FIG. 4, passes through the write element 402 between the shaping layer 412, and the return pole 414. The write coil 418 is surrounded by an electrically insulating material 420 that electrically insulates the turns of the coil 418 from one another and electrically isolates the coil 418 from the surrounding magnetic structures 410, 412, 416, 414. When a current passes through the coil 418, the resulting magnetic field causes a magnetic flux to flow through the return pole 414, back gap 416, shaping layer 412 and write pole 410. This magnetic flux causes a write field 422 to be emitted toward an adjacent magnetic medium 424. As described in the background of the invention, the magnetic medium preferably includes a thin magnetically hard top layer 426 and a magnetically softer underlayer 428. The strong, highly concentrated magnetic field from the write pole 410 magnetizes, (ie. fixes the magnetic moment of) the magnetically hard top layer 426, and the resulting magnetic flux 420 travels through the soft underlayer 428. The flux travels to the return pole 414 where it passes back through the magnetically hard top layer 426 toward the return pole 414. As the magnetic flux 430 passes through the top layer 426 to the return pole 414, it is sufficiently spread out and week so as not to affect the magnetization of the magnetically hard top layer 424.

With continued reference to FIG. 4, the areas surrounding the write element 402, shields 406, 408 and the magnetoresistive read element are filled with a non-magnetic, electrically insulating material 432, such as for example alumina ($Al_2O_3$). This insulating material 432 can be formed in multiple layers.

Figure 5A:
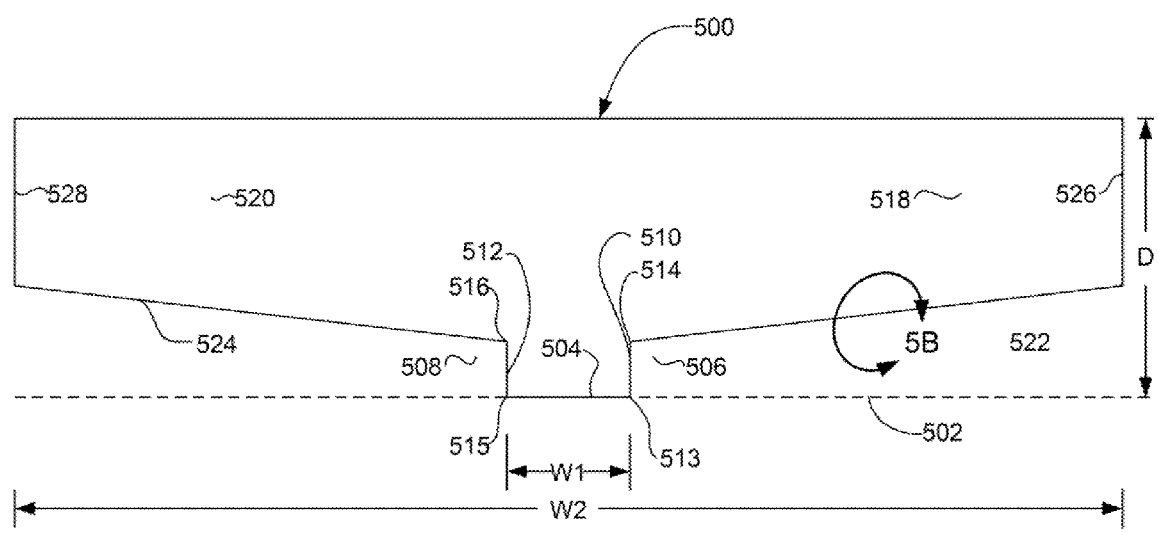
FIG. 5A is a view, taken from line 5A-5A of FIG. 4, shown enlarged, of a magnetic structure according to a possible embodiment of the invention.
Figure 5B:
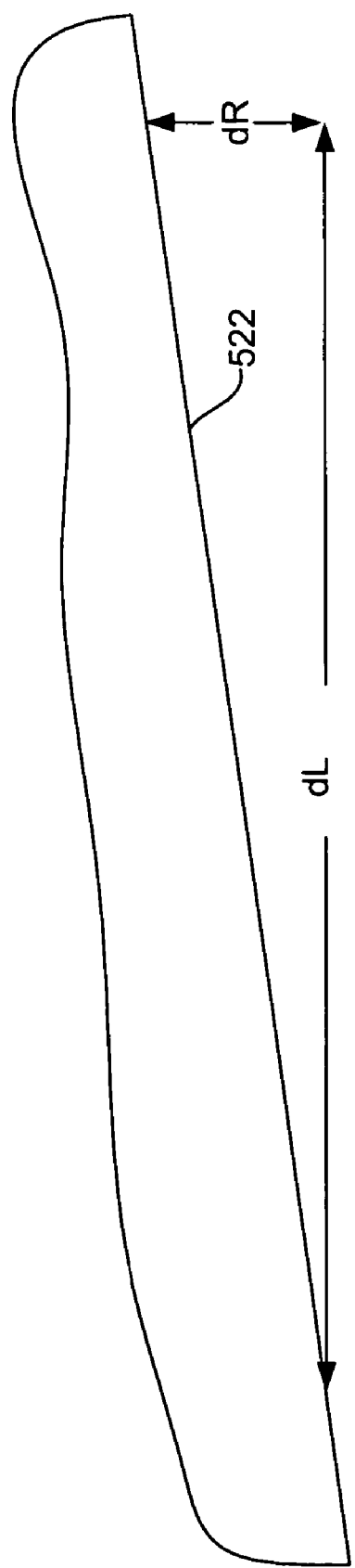
FIG. 5B is a view, taken from circle 5B of FIG. 5A, shown enlarged, illustrating the slope of the tapered front edge of a wing of the magnetic structure or FIG. 5A.

With reference now to FIG. 5, a magnetic structure 500 having improved resistance to stray field writing is described. The magnetic structure can be for example a magnetic shield 406, 408 (FIG. 4), magnetic return pole 414 (FIG. 5) or any other necessary magnetic structure that might be present in a magnetic head 221 having an air bearing surface (ABS) indicated by dashed line 502. The problem of stray field writing is particularly acute with regard to magnetic shields, since they are by their nature designed to absorb magnetic fields from their surroundings. Therefore, for purposes of clarity the magnetic structure will be described in terms of a magnetic shield 500, although it should be understood that the magnetic structure could be any magnetic structure.

As discussed above in the background of the invention, environmental magnetic fields, which can be caused by many different sources such as airport security equipment or cellular phones, result in magnetic flux which flows through the shield 500. The flow of magnetic flux through a magnetic structure is strongly affected by the geometry such of a structure. Lines of flux become greatly concentrated at abrupt features, especially corners of a magnetic structure. Prior art magnetic shields, which have had sharp corners located near the ABS have exhibited strong concentration of magnetic flux near the ABS, which has resulted in magnetic fields being emitted from these corners toward a nearby magnetic medium. This has resulted in stray field writing and the complete erasure of magnetic signal from portions of the magnetic medium.

With continued reference to FIG. 5, the magnetic shield 500 includes an extending or forward protruding portion 504, which extends toward the ABS surface 502. The forward protruding portion 504 preferably extends to and is exposed at the ABS surface, but may also be recessed from the ABS by some amount, and also preferably has a flat surface at the ABS 502. The protruding portion 504 is preferably formed at or near the center of the shield 502. The first and second notches 506, 508 formed at either side of the protruding portion form the lateral sides 510, 512 of the protruding portion 504, defining the width of the protruding portions 504. The notches 506, 508 are preferably recessed about 0.3 to 3 micrometers into the head 221 as measured from the ABS terminating at inner corners 514, 516, which may be sharp or rounded. The notches 506, 508 also form outer corners 513, 515, which also may be sharp or rounded.

The shield 500 also includes first and second wing portions 518, 520 that extend laterally outward. Each wing portion 518, 520 has a front edge 522, 524 that extends from the inner corner 514, 516 of each notch 506, 508 to an outer end 526, 528 of each wing 518, 520. The front edge 522, 524 slopes away from the ABS as it extends laterally outward from the forward extending portion, so that the front edge 522, 524 of each wing 518, 520 is further from the ABS at its respective outer end 526, 528 than it is at the inner corner 514, 516. The front edge 522, 524 of each wing 518, 520 may have some sort of contour, but is preferably straight, having a constant slope. The slope of the front edge 522, 524 of each wing is measured as the change in distance from the ABS divided by a corresponding change in distance measured laterally in the direction from the notch 506, 508 to the outer end 526, 528. This slope can be more readily understood with reference to FIG. 5A, wherein the slope of the front edge 522 is dR/dL, dR being the change in recess from the ABS and dL being the change in the distance measured longitudinally. The slope corresponding to dR/dL preferably defines an angle 1 to 15 degrees with respect to the ABS 502 (FIG. 5A), but may be some other suitable slope. As can be seen the tapered slope causes the outer ends 526, 528 to be recessed a greater amount from the ABS 522 than would be the case without the tapered slope. The front edge 522, 524 of each wing 518, 520 at its outer most end is preferably recessed 0.5 um to 8 um from the ABS 502.

With continued reference to FIG. 5, the forward protruding portion has a width W1 measured along the ABS surface that is defined by the distance between the first and second laterally opposed sides 510, 506 formed by the notches 506, 508. The wings 518, 520 preferably have a length from the notch 514, 516 to the respective wing end 526, 528 of about 10 um to 100 um, however, these dimensions are not a requirement to practice the present invention and W1 and L could be some other size. In addition, limiting the depth D helps to limit the stray field effect of vertical magnetic fields (ie. fields perpendicular to the ABS 502.

With continued reference to FIG. 5, the shield 221 has overall dimensions that include a lateral width W2 measured from the tip 526 of the first wing 518 to the tip 528 of the second wing 520. The shield 500 also has a back edge 530 opposite the ABS 502. The shield has an overall depth D measured as the distance from the ABS to the back edge 530. The overall width of the shield 500 can be 40 um to 200 um, but could also be some other dimension. The overall depth D is preferably smaller than 20 um, but could be some other dimension. In addition, the ratio of the overall width W2 to the overall depth D is preferably 0.5 to 3, but could also be some other ratio. In addition, with continued reference to FIG. 5, the shield 500 has a thickness (not shown) oriented into the plane of the page. This thickness can vary, but is preferably 0.3 um to 5 um. Although already mentioned above, it should be pointed out again that the magnetic structure 500 is being described herein in terms of a magnetic shield, but could be one of many other types of magnetic structures needed in a magnetic head either presently or in a future magnetic head.

The tapered recessed wings 518, 520 prevent stray field writing in at least a couple of ways. Merely forming first and second notches 510 and 512 and non-tapered wings would help to prevent stray field writing to some extent. Flux traveling laterally through the shield 500 will in a sense be funneled through the wings, and will not become concentrated at the outer corners 513, 515 of the forward extending portion. Since the outer corners 513, 515 of the forward extending portion 504 are at a location close to the magnetic medium 424 (FIG. 4), this would a very problematic place to have flux concentration. However, flux will still end up being concentrated at the outer corners of the wing portions, and this concentration of flux at the end corners of the wing portions is exacerbated by increased wing length.

With reference to FIG. 5A, it can be seen that even though the magnetic flux may be concentrated at the outer corners 532, 534 of the wing portions 518, 520, this concentration of flux is at a location displaced sufficiently away from the ABS that it is incapable of imparting a magnetic signal on a passing magnetic medium 424.

With continued reference to FIG. 5A, another advantage of the tapered wing can be seen. Due to the tapered shape of front edges 522, 524 of the wings 518, 520, the outer corners 532, 534 of the wings 518, 520 are obtuse. This obtuse angle of the outer corners 532, 534 creates less of a flux concentration, resulting in a smaller emitted magnetic field.

Figure 6:
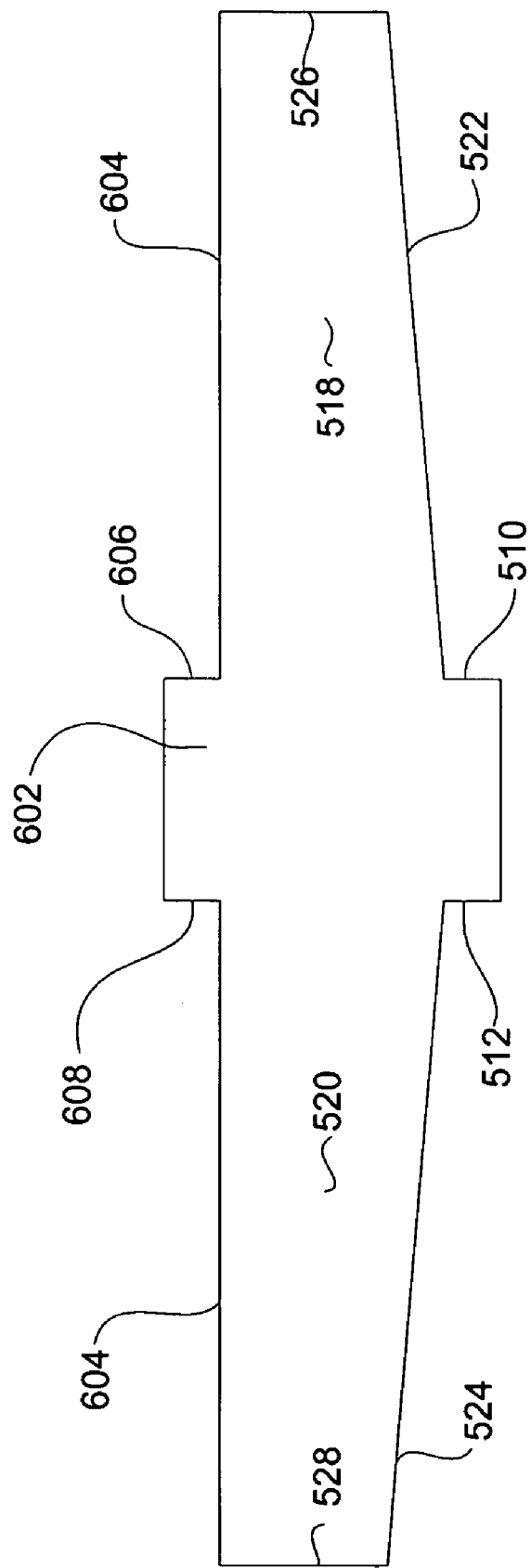
FIG. 6 is a view, similar to that of FIG. 5 of a magnetic structure according to an alternate embodiment of the invention.

With reference to FIG. 6, in an alternate embodiment of the invention, a shield 600 is formed with a forward protruding portion 602 as well as a back protruding portion 504. The back protruding portion 602 extends from the back edge 604 of the shield 600 in the direction away from the ABS and terminates at first and second sides 606, 608 The backward protruding portion has a depth that is preferably 0.1 D to 0.7 D, and has a width W3 defined by the distance between the first and second sides. The width W3 of the backward protruding portion need not be the same as the width W1 of the forward protruding portion 504, and need not be aligned with or symmetrical with the forward protruding portion 504. As with the previously described embodiment, the shield 600 has wings 518, 520 that extend from the sides 510, 512 of the forward protruding portion to outer ends 526, 528, and have tapered front edges 522, 524.

Figure 7:
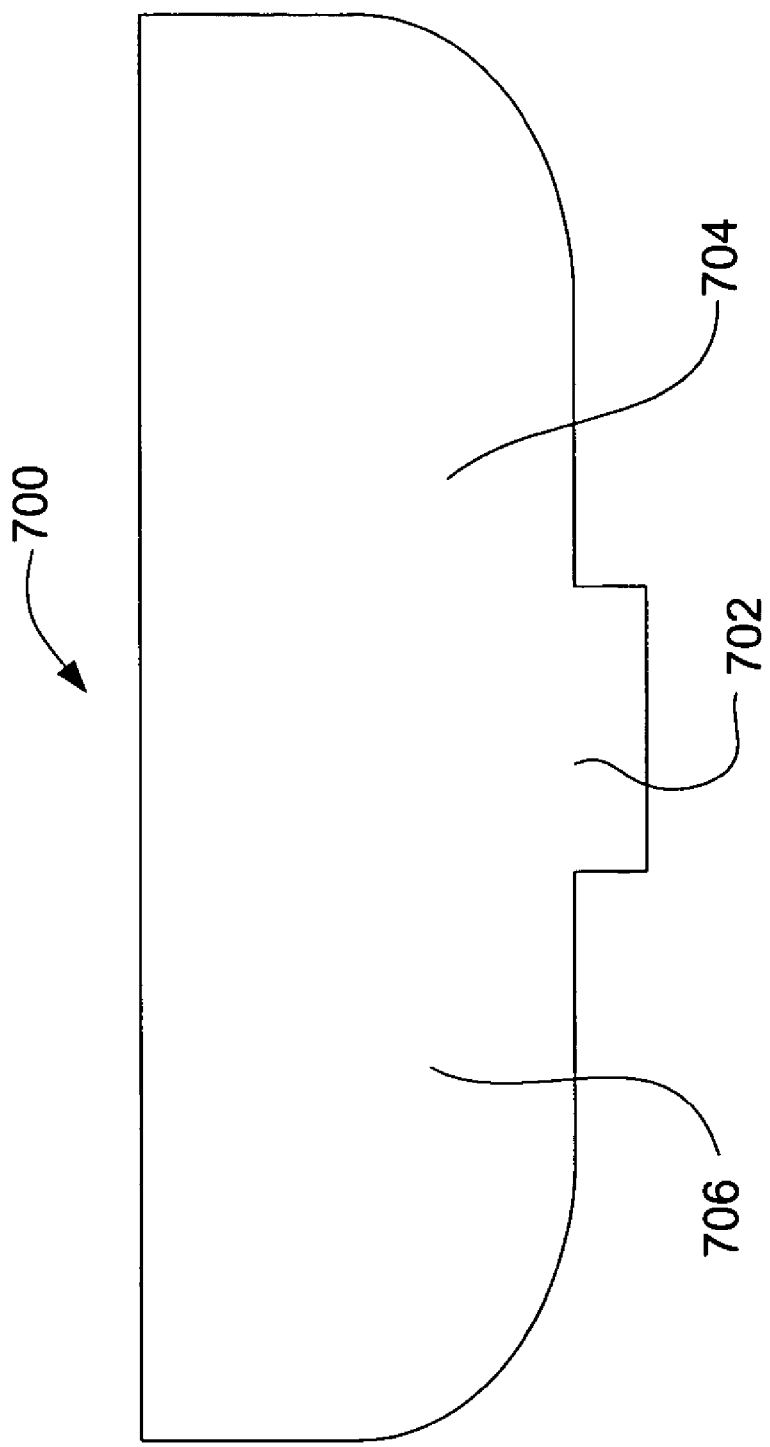
FIG. 7 is a view similar to that of FIG. 5 of a magnetic structure according to another alternate embodiment of the invention.

With reference now to FIG. 7, an alternate embodiment of the invention includes a magnetic structure 700 having a central forward extending portion 702 and having first and second laterally extending wings 706, 704 having a non linear front edge that curves away from the ABS to form rounded corners. The rounded corners advantageously prevent eliminate the sharp corners at the outer ends of the wings 704, 706 near the ABS, thereby further preventing stray field writing.

Figure 8:
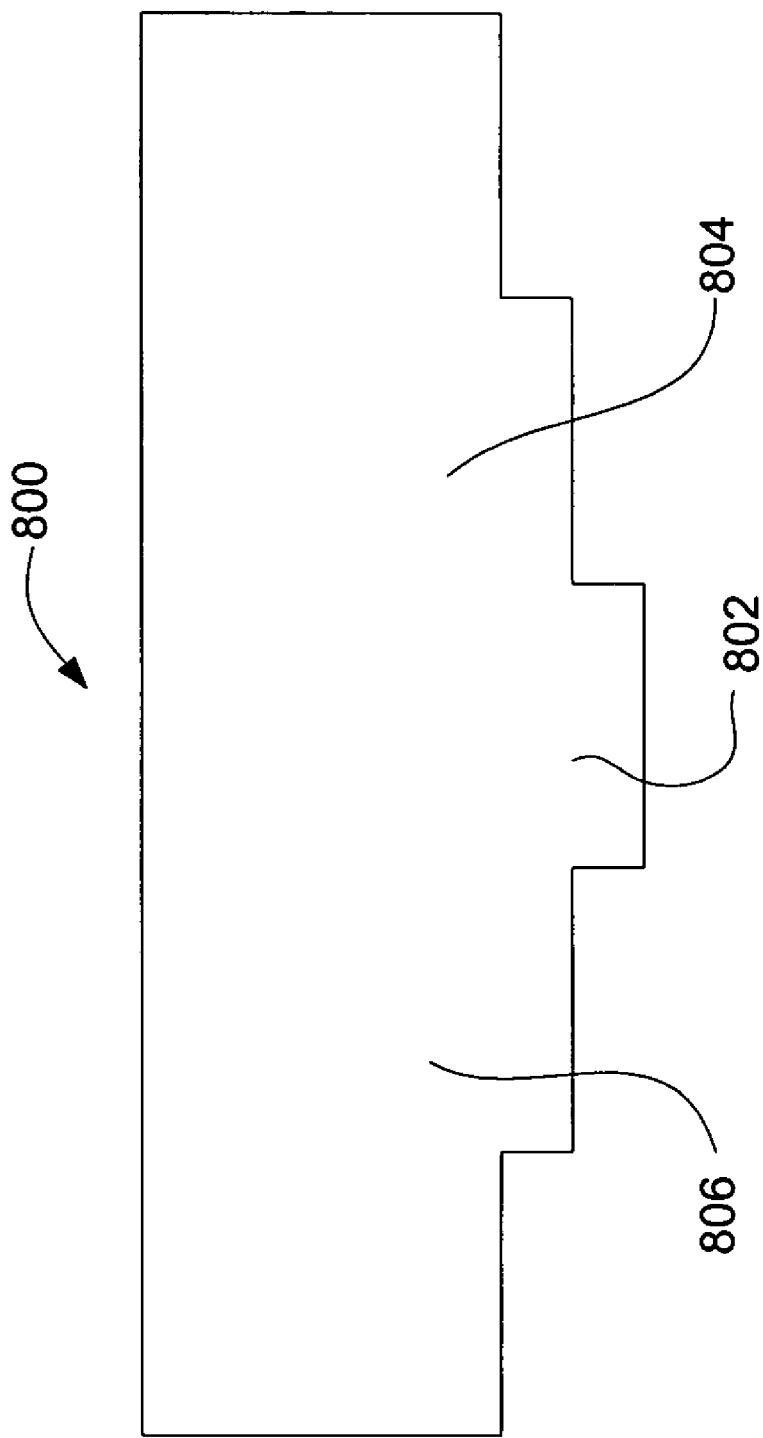
FIG. 8 is a view similar to that of FIG. 6 of a magnetic structure according to yet another embodiment of the invention.

With reference now to FIG. 8, in yet another embodiment of the invention, a magnetic structure 800 is provided that has a forward extending center portion 802, and first and second wings 804, 806 having a plurality of steps. The multi-step provides certain manufacturing advantages, while also providing increased spacing from the ABS at the outer end of the wings 804, 806.

While various embodiments have been described above, it should be understood that they have been presented by way of example only, and not limitation. Other embodiments falling within the scope of the invention may also become apparent to those skilled in the art. For example although the invention has been described as being incorporated into a perpendicular recording system and would be particularly suited to use in such a system, the invention may be practiced in any magnetic recording system including a longitudinal magnetic recording system. Thus, the breadth and scope of the invention should not be limited by any of the above-described exemplary embodiments, but should be defined only in accordance with the following claims and their equivalents.

What is claimed is:

1. A magnetic head having an air bearing surface (ABS), comprising: a magnetic shield, the magnetic shield further comprising:
   a forward protruding portion extending toward the ABS and terminating at first and second laterally opposed sides that are substantially perpendicular with the air bearing surface; and
   first and second laterally extending wing portions, extending laterally outward from the first and second sides of the center portion, each of the laterally extending wing portions having a tapered front edge that is recessed from the air bearing surface by a distance that increases with increasing distance from the forward protruding portion, the front edge being from an inner end of the wing portion located at a side of the forward protruding portion to an outermost end of the magnetic structure.

2. A magnetic structure as in claim 1 wherein the front edge of each of the laterally extending wing portions has a slope that defines an angle of 1 to 15 degrees with respect to the ABS.

3. A magnetic structure as in claim 1 wherein each of the laterally extending wing portions has an outer end and wherein the front edge of each wing at its outer end is recessed from the air bearing surface by a distance of 0.5 um to 8 um.

4. A magnetic structure as in claim 1 wherein each of the laterally extending wing portions has an in inner portion disposed at the junction of the laterally extending wing portion and the respective side of the forward protruding portion and wherein inner portion of each laterally extending wing portion is recessed from the ABS by a distance of between 0.3 um to 3.0 um.

5. A magnetic structure as in claim 1, wherein each of the wings portions has a non-linear front edge adjacent to the ABS that curves away from the ABS.

6. A magnetic structure as in claim 1 wherein the magnetic structure is a magnetic shield disposed adjacent to a magnetoresistive read sensor.

7. A magnetic structure as in claim 1 wherein the magnetic structure forms a portion of a magnetic write head.

8. A magnetic structure as in claim 1 wherein the magnetic structure is incorporated into a magnetic head for use in a perpendicular magnetic recording system.

9. A magnetic structure as in claim 1 wherein the magnetic structure has a back edge disposed opposite the air bearing surface (ABS) and wherein the back edge has a substantially constant distance from the ABS.

10. A magnetic structure as in claim 1 wherein the magnetic structure has a back edge disposed opposite the air bearing surface (ABS), and wherein the magnetic structure further comprises a backward protruding portion that extends from the back edge in a direction away from the ABS.

11. A magnetic structure as in claim 1 wherein each of the first and second wing portions has a plurality of steps formed in the front edge adjacent to the ABS, the front edge having a distance from the ABS that increases with each step as the wing progresses laterally outward.

12. A magnetic structure as in claim 1 wherein the backward protruding portion is disposed near the center of the magnetic structure.

13. A magnetic structure as in claim 1 wherein the magnetic structure comprises CoFe.

14. A magnetic structure as in claim 1 wherein forward protruding portion extends to the ABS.

15. A magnetic structure as in claim 1 wherein the forward protruding portion is recessed from the ABS.

16. A magnetic structure as in claim 1 wherein:
   the magnetic structure has an overall width W measured from the outer end of the first laterally extending wing portion to the outer end of the second laterally extending wing portion,
   the magnetic structure has a back edge formed opposite the ABS
   the magnetic structure has a depth D measured from the forward most edge of the forward extending portion to the back edge; and
   the ratio of D/W is between ⅓ and 2.

17. A magnetic head for use in a magnetic recording system and having an air bearing surface, the magnetic head comprising:
   a magnetic write element comprising:
      a write pole constructed of a magnetic material;
      a return pole constructed of a magnetic material, the return pole having a larger cross section than the write pole; and
      an electrical coil disposed between the write pole and the return pole;
   a magnetoresistive sensor disposed near the write element; and
   a magnetic shield disposed adjacent to and electrically insulated from the magnetoresistive sensor, the magnetic shield being constructed of a magnetic material and comprising:
      a forward protruding portion extending toward the ABS and terminating at first and second laterally opposed sides that are substantially perpendicular to the ABS; and
      first and second laterally extending wing portions, extending laterally outward from the first and second sides of the center forward protruding portion, the laterally extending wing portions each having a tapered front edge that is recessed from the air bearing surface by a distance that increases with increasing distance from the forward protruding portion, the front edge being from an inner end of the wing portion located at a side of the forward protruding portion to an outermost end of the magnetic structure.

18. A magnetic head as in claim 17 wherein each of the front edge of each laterally extending wing portion has a slope that defines an angle of 1-15 degrees with respect to the ABS.

19. A magnetic head as in claim 17 wherein each of the laterally extending wing portions has an outer end and wherein the front edge of each wing at its outer end is recessed from the air bearing surface by a distance of 0.5-8.0 um.

20. A magnetic head as in claim 17 wherein each of the laterally extending wing portions has an in inner portion disposed at the junction of the laterally extending wing portion and the respective side of the forward protruding portion and wherein inner portion of each laterally extending wing portion is recessed from the ABS by a distance of between 0.3-3.0 um.

21. A magnetic head as in claim 17, wherein:
at least one of the laterally extending wing portions extends a distance 10 um to 100 um from the forward protruding portion.

22. A magnetic head as in claim 17 wherein the magnetic structure is a magnetic shield disposed adjacent to a magnetoresistive read sensor.

23. A magnetic head as in claim 17 wherein the magnetic structure forms at least a portion of a magnetic pole of a write head.

24. A magnetic head as in claim 17 wherein the magnetic structure has a back edge disposed opposite the air bearing surface (ABS) and wherein the back edge has a substantially constant distance from the ABS.

25. A magnetic head as in claim 17 wherein the magnetic structure has a back edge disposed opposite the air bearing surface (ABS), and wherein the magnetic structure further comprises a backward protruding portion that extends from the back edge in a direction away from the ABS.

26. A magnetic head as in claim 17 wherein forward protruding portion extends to the ABS.

27. A magnetic data recording system, comprising:
a magnetic medium;
an actuator;
a slider connected with the actuator for movement adjacent to the magnetic medium;
a magnetic head connected with the slider, the magnetic head comprising:
a magnetic write element comprising:
a write pole constructed of a magnetic material;
a return pole constructed of a magnetic material, the return pole having a larger cross section than the write pole; and
an electrical coil disposed between the write pole and the return pole;
a magnetoresistive sensor disposed near the write element; and
a magnetic shield disposed adjacent to and electrically insulated from the magnetoresistive sensor, the magnetic shield being constructed of a magnetic material and comprising:
a forward protruding portion extending toward the ABS and terminating at first and second laterally opposed sides that are substantially perpendicular to the ABS; and
first and second laterally extending wing portions, extending laterally outward from the first and second sides of the center forward protruding portion, the laterally extending wing portions each having a tapered front edge that is recessed from the air bearing surface by a distance that increases with increasing distance from the forward protruding portion, the front edge being from an inner end of the wing portion located at a side of the forward protruding portion to an outermost end of the magnetic structure.

28. A magnetic recording system, as in claim 27 wherein each of the first and second wing portions has a minimum amount of recess from the ABS at its inner end that is between 0.3 um and 3.0 um and has a maximum amount of recess from the ABS at its outer end that is between 0.5 um and 8.0 um.

29. A magnetic data recording system as in claim 27 wherein the front edge of each of the laterally extending wing portions has a slope that defines an angle of 1-15 degrees with respect to the ABS.

* * * * *